May 5, 1925.　　　　　　　　　　　　　　　　　　1,536,626
A. T. POTTER
HINGE CONSTRUCTION
Filed Oct. 27, 1924
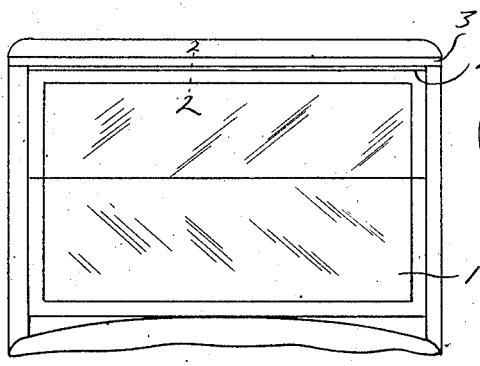
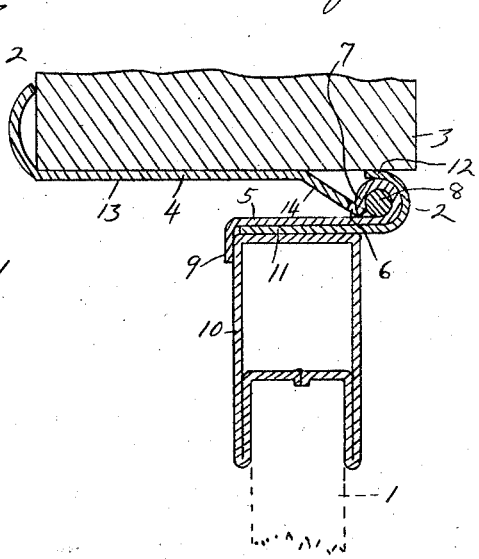
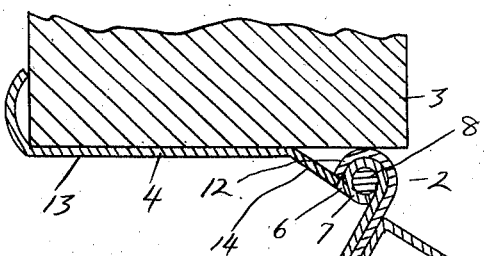
Inventor
Albert T. Potter
Attorney Patented May 5, 1925.

1,536,626

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

HINGE CONSTRUCTION.

Application filed October 27, 1924. Serial No. 746,078.

*To all whom it may concern:*

Be it known that I, ALBERT T. POTTER, a citizen of the United States of America, residing at Detroit, in the county of Wayne and State of Michigan, have invented certain new and useful Improvements in Hinge Constructions, of which the following is a specification, reference being had therein to the accompanying drawings.

This invention relates generally to hinge constructions and refers more particularly to piano hinges for connecting windshields, visors, and the like to the supporting framework of vehicle bodies.

One of the essential objects of the invention is to provide a hinge of this type in which the pintle receiving portions of the hinge sections are preferably covered by a neat finish plate that effectively protects the joint between the sections from the weather regardless of the position of adjustment of the windshield.

A further object is to provide a strong and durable hinge that is simple in construction and can be manufactured at a comparatively low cost.

With the above and other objects in view the invention consists in certain novel features of construction, combinations and arrangements of parts as will be more fully described and particularly pointed out in the appended claims.

In the accompanying drawing:

Figure 1 is a front elevation of a vehicle body embodying my invention.

Figure 2 is a sectional view taken on the line 2—2 of Figure 1.

Figure 3 is a view similar to Figure 2, showing the windshield in raised position.

Heretofore plates of various kinds have been provided for protecting the joints between the sections of piano hinges which were used for supporting windshields and the like. However, such plates usually interfered with the raising of the windshield when they extended fully around the pintle receiving portions of the hinge sections or else did not protect the joints between the hinge sections against the weather in all positions of adjustment of the windshield when the plates extended only partially around the pintle receiving portions of the hinge sections. With the present invention, the objectionable features just referred to are overcome entirely, first, by providing a piano hinge in which the main supporting section thereof has been inverted with respect to the cooperating section, so that the pintle receiving portions of the hinge project above the forward edges of the uppermost hinge plate and are located immediately below the windshield header of the vehicle body; and secondly, by providing a neat finish plate having an open return-bent portion that extends sufficiently around the pintle receiving portions of the hinge sections to protect the joint in all positions of adjustment of the windshield.

Referring now to the drawings in which like characters of reference designate corresponding parts throughout the several views, the numeral 1 designates a windshield of conventional form that is preferably connected by a piano hinge 2 to a suitable support such as the windshield header 3 of a vehicle body of the closed type. As shown, the hinge 2 preferably comprises two elongated plates 4 and 5 respectively that are preferably provided at their forward edges with open return-bent portions 6 and 7 respectively which embrace a suitable pintle 8. The plate 4 preferably constitutes the main supporting part of the hinge and for that purpose is secured to the windshield header 3 of the vehicle body, while the plate 5 constitutes the cooperating hinge part and is provided at its rear end with a depending flange 9 that extends over the rear edge of the top rail 10 of the windshield frame.

For concealing and protecting the joint between the plates 4 and 5 of the hinge, I preferably provide an elongated finish plate 11 that is preferably provided at its forward edge with an upwardly and rearwardly extending return-bent portion 12 that covers the pintle receiving portions 6 and 7 respectively of the hinge plates. As shown, this plate 11 is preferably interposed between the hinge plate 5 and the windshield rail 10 and is preferably welded thereto. In order that the return-bent portion 12 of the plate 11 will protect the joint between the hinge parts 4 and 5 against the weather regardless of the position of adjustment of the windshield, and will not interfere with the outward swinging movement of the windshield to the proper open position thereof, the main hinge plate 4 is preferably inverted with respect to the cooperating plate 5 and is bent adjacent to the pintle receiving portions 6 before the plates 4 and 5 are assembled so that the flat portion 13 of the hinge plate may be readily secured to the windshield header 3 of the vehicle body and the pintle receiving portions of both plates will project above the forward edge of the main plate 4 and therefore will be disposed immediately below the windshield header when the windshield is mounted thereon. Thus, when the windshield is closed, the rear end of the return bent portion 12 of the plate extends in a line tangent to the pintle receiving portions 6 and 7 and is preferably in alignment with the flat attaching portion 13 of the main hinge part 4, consequently the return bent portion 12 of the plate 11 conceals and protects the joint between the hinge parts and is spaced sufficiently away from the inclined portion 14 of the hinge part 4 to enable the windshield to be raised to the desired open position.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a closure member, and a support therefor, of a hinge having sections secured to the support and closure member respectively, the section secured to the support having a depending portion terminating in spaced return bent portions extending above the lower edge of the depending portion, the section secured to the closure member having spaced return bent portions, a pintle connecting the return-bent portions of the hinge sections, and means for concealing the joint between the hinge sections in all positions of adjustment of the closure member including a plate secured to the closure member and one hinge section having a return bent portion extending around the return bent portions of both hinge sections.

2. In a vehicle body, the combination with a windshield header, and a windshield, of a hinge having pivotally connected sections secured respectively to the lower face of the header and to the upper face of the windshield, the section secured to the header having a portion extending downwardly and forwardly from the header, and means secured to the other section concealing the pivotal connection between both sections and engageable with the downwardly extending portion of the section secured to said header for limiting the outward swinging movement of the windshield.

3. In a vehicle body, the combination with a windshield header, and a windshield, of a hinge having pivotally connected sections secured respectively to the header and windshield, the section secured to the header having an inclined portion at its forward edge, and means secured to the other section concealing the pivotal connection between both sections and engageable with the inclined portion of the section secured to said header for limiting the outward swinging movement of the windshield.

4. In a vehicle body, the combination with a windshield header, and a windshield, of a hinge having pivotally connected sections secured respectively to said header and windshield, the section secured to the header having an inclined portion at its forward edge, and a plate secured to the other section having a return-bent portion concealing the pivotal connection between both sections and engageable with the inclined portion of the section secured to said header for limiting the outward swinging movement of the windshield.

In testimony whereof I affix my signature.

ALBERT T. POTTER.